(12) United States Patent
Su

(10) Patent No.: US 6,598,889 B1
(45) Date of Patent: Jul. 29, 2003

(54) GOLF BAG CART

(76) Inventor: Po-Tang Su, No. 41, Lane 38, Jui Long Dong Rd., Fongsan City, Kaohsiung, Hsien (TW)

( * ) Notice: Subject to any disclaimer, the term of this patent is extended or adjusted under 35 U.S.C. 154(b) by 12 days.

(21) Appl. No.: 10/038,621

(22) Filed: Jan. 8, 2002

(51) Int. Cl.[7] .................................................. B62B 1/00
(52) U.S. Cl. .............................. 280/47.26; 280/DIG. 6; 280/47.131; 248/96
(58) Field of Search ...................... 280/47.26, DIG. 6, 280/47.17, 47.18, 47.24, 47.34, 47.131, 37, 38, 39, 40, 651, 652, 639, 79.2; 248/96, 98

(56) References Cited

U.S. PATENT DOCUMENTS

| | | | | |
|---|---|---|---|---|
| 1,744,414 A | * | 1/1930 | Pflaum | 280/47.33 |
| 1,955,463 A | * | 4/1934 | Lathrop | 206/315.7 |
| 3,301,570 A | * | 1/1967 | Berman | 280/47.131 |
| 3,837,666 A | * | 9/1974 | Hodson | 280/47.131 |
| 4,635,951 A | * | 1/1987 | Berfield et al. | 280/47.34 |
| 4,640,521 A | * | 2/1987 | Berfield | 280/47.34 |
| 4,650,200 A | * | 3/1987 | Berfield et al. | 280/47.26 |
| 5,029,883 A | * | 7/1991 | Derito | 280/35 |
| 5,924,709 A | * | 7/1999 | Yang | 280/47.26 |
| 6,048,037 A | * | 4/2000 | Cheng | 301/111.06 |
| 6,148,998 A | * | 11/2000 | Tan | 206/315.3 |
| 6,299,183 B1 | * | 10/2001 | Kaneko | 280/47.26 |
| 6,364,327 B1 | * | 4/2002 | Liao | 280/40 |
| 6,439,585 B1 | * | 8/2002 | Tan | 280/47.26 |
| 6,460,867 B2 | * | 10/2002 | Sciulli | 280/47.26 |
| 6,513,816 B1 | * | 2/2003 | Kijima | 280/47.26 |
| 2002/0033583 A1 | * | 3/2002 | Engelhardt et al. | 280/47.26 |

* cited by examiner

*Primary Examiner*—Brian L. Johnson
*Assistant Examiner*—J. Allen Shriver
(74) *Attorney, Agent, or Firm*—Varndell & Varndell, PLLC

(57) ABSTRACT

A golf bag cart is constructed to includes a golf bag and a cart adapted for supporting and carrying the golf bag, the golf bag having two lateral plug holes and a front springy retaining block, the card having a retaining hole adapted for receiving the springy retaining block of the bottom cuff of the golf bag, and a smoothly arched supporting frame adapted for supporting the golf bag, the supporting frame having two plug portions adapted for engaging into the plug holes of the bottom cuff of the golf bag.

3 Claims, 5 Drawing Sheets

GOLF BAG CART

BACKGROUND AND SUMMARY OF THE INVENTION

The present invention relates to a golf bag cart that can be carried on the user's shoulders and, more particularly, to such a golf bag cart, which enables the user to easily detach the golf bag from the cart.

Various golf carts are known. FIG. 1 shows a folding collapsible golf cart according to the prior art. This structure of golf cart 3 comprises an upper bag cradle and a lower bad cradle respectively mounted on the main shaft member thereof for holding a golf bag 4. This design of golf cart has drawbacks as follows:

1. In convenience in use:
    When in use, the user must extend out the golf cart, and the put the golf bag on the upper bag cradle and the lower bag cradle, and then fasten tight the straps of the upper and lower bag cradles.
2. Space occupation:
    The golf cart occupies much storage space even if when folded up.
3. High manufacturing cost:
    Because of complicated structure, the manufacturing cost of the golf bag cart is high.

In order to eliminate the aforesaid drawbacks, the inventor of the present invention invented a new design of golf bag cart under U.S. Pat. No. Des. 385.114. This design of golf bag cart is functional, however the golf bag is not detachable.

The present invention has been accomplished under the circumstances in view. It is the main object of the present invention to provide a golf bag cart, which is inexpensive to manufacture. It is another object of the present invention to provide a golf bag cart, which occupies less storage space. It is still another object of the present invention to provide a golf bag cart which enables the user to conveniently detach the golf bag from the cart.

DETAILED DESCRIPTION OF THE PREFERRED EMBODIMENT

Figure 1:
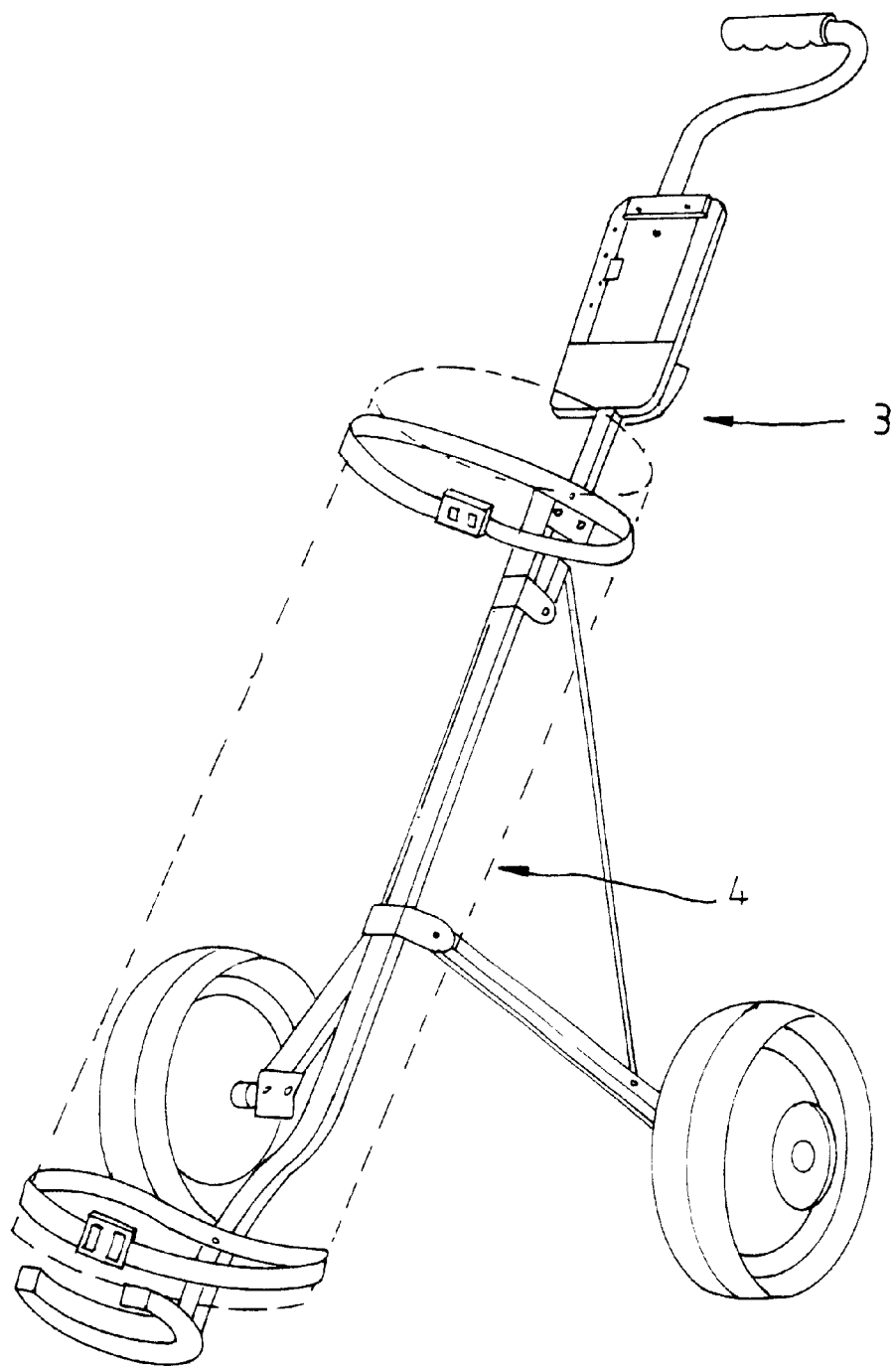
FIG. 1 illustrates a golf cart according to the prior art.

Referring to Figures from 2 through 4, a golf bag cart in accordance with the present invention is shown comprised of a golf bag 1 and a cart 2. The golf bag 1 comprises a plastic bottom cuff 11, a front carrying handle 16, a shoulder strap 12, a front pulling strap 13, and a rear foldaway stand 10. The cart 2 comprises a base frame 21, two wheel holders 211 and 212 provided at two opposite lateral sides of the base frame 21, two wheels 210 respectively pivoted to the wheel holders 211 and 212.

The main characteristics of the present invention are outlined hereinafter with reference to FIGS. from 2 through 4 again. The plastic bottom cuff 11 of the golf bag 1 comprises two plug holes 111 and 112 disposed at two opposite lateral sides, and a springy retaining block 113 protruded from the peripheral wall 110 thereof at the front side. The springy retaining block 113 has a fixed end integral with the plastic bottom cuff 11, a free end terminating in a hooked portion 1131, and a back sidewall 1130 spaced from the peripheral wall 110 of the plastic bottom cuff 11 at a distance. The base frame 21 of the cart 2 comprises a front locating plate 213, a retaining hole 2131 disposed in the front locating plate 213 and adapted for receiving the springy retaining block 113 of the golf bag 1, a smoothly arched supporting frame 22 disposed at the front side of the front locating plate 213. The smoothly arched supporting frame 22 has two plug portions 221 and 222 respectively forwardly extended from the two distal ends thereof and adapted for plugging into the plug holes 111 and 112 of the plastic bottom cuff 11 of the golf bag 1. Further, the plug portions 221 and 222 have a respective beveled top guide edge 2211 or 2221 for easy insertion into the plug hole 111 or 112 of the plastic bottom cuff of the golf bag 1. During assembly process, the plug portions 221 and 222 of the smoothly arched supporting frame 22 of the cart 2 are respectively plugged into the plug holes 111 and 112 of the plastic bottom cuff of the golf bag 1, and the springy retaining block 113 of the golf bag 1 is inserted into the retaining hole 2131 of the locating plate 213 to force the hooked portion 1131 into engagement with the retaining hole 2131. When assembled, the golf bag 1 is positively supported on the smoothly arched supporting frame 22 of the cart 2. When assembled, the user can carry the golf bag cart on the shoulders, or pull the golf bag cart on the ground from place to place.

Figure 5:
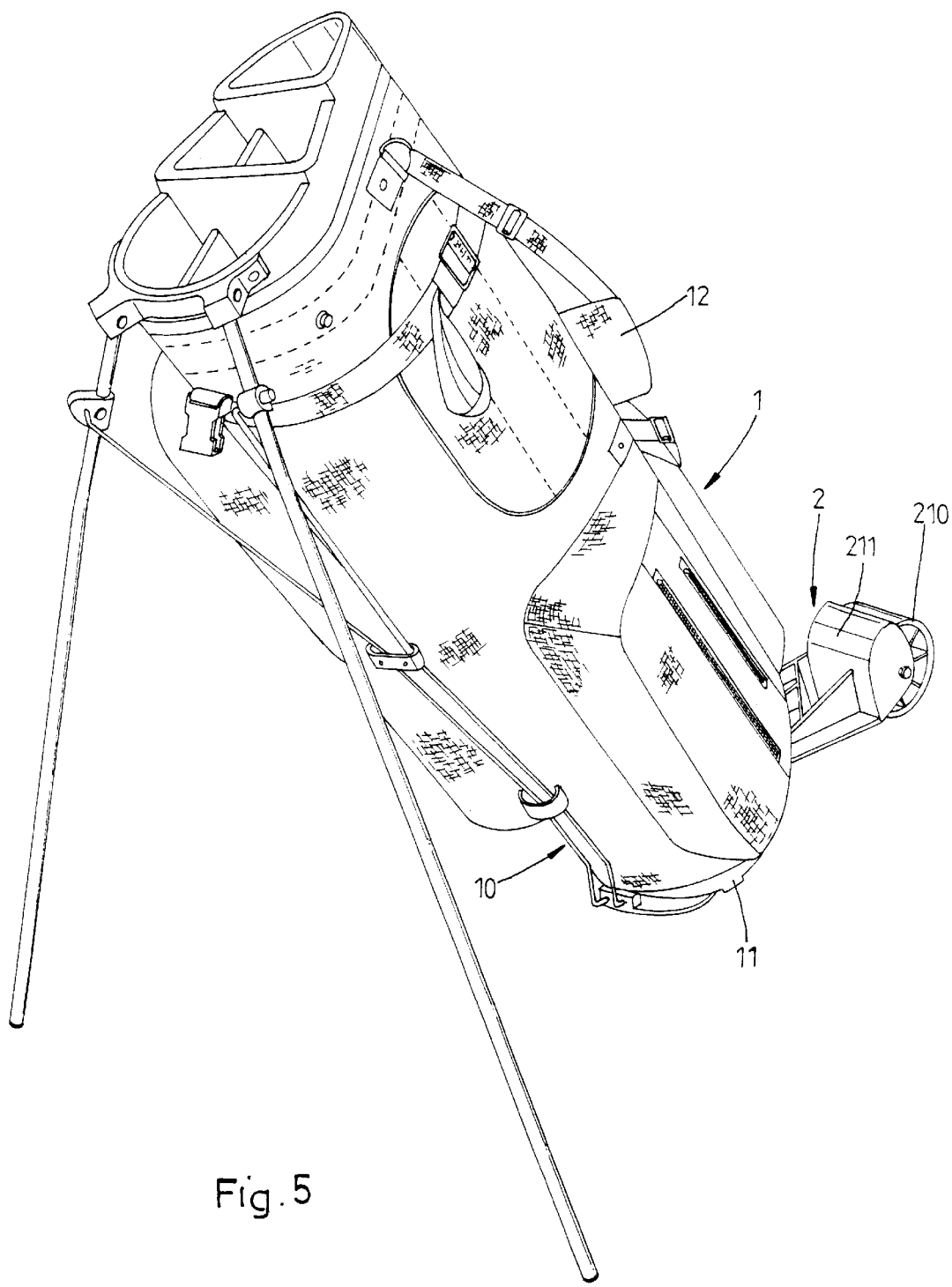
FIG. 5 shows the golf bag supported on the cart and the foldaway stand in a tilted position.

Referring to FIG. 5, the foldaway stand 10 is extended out to support the golf bag 1 with the cart 2 positively on the ground in a tilted position.

Figure 2:
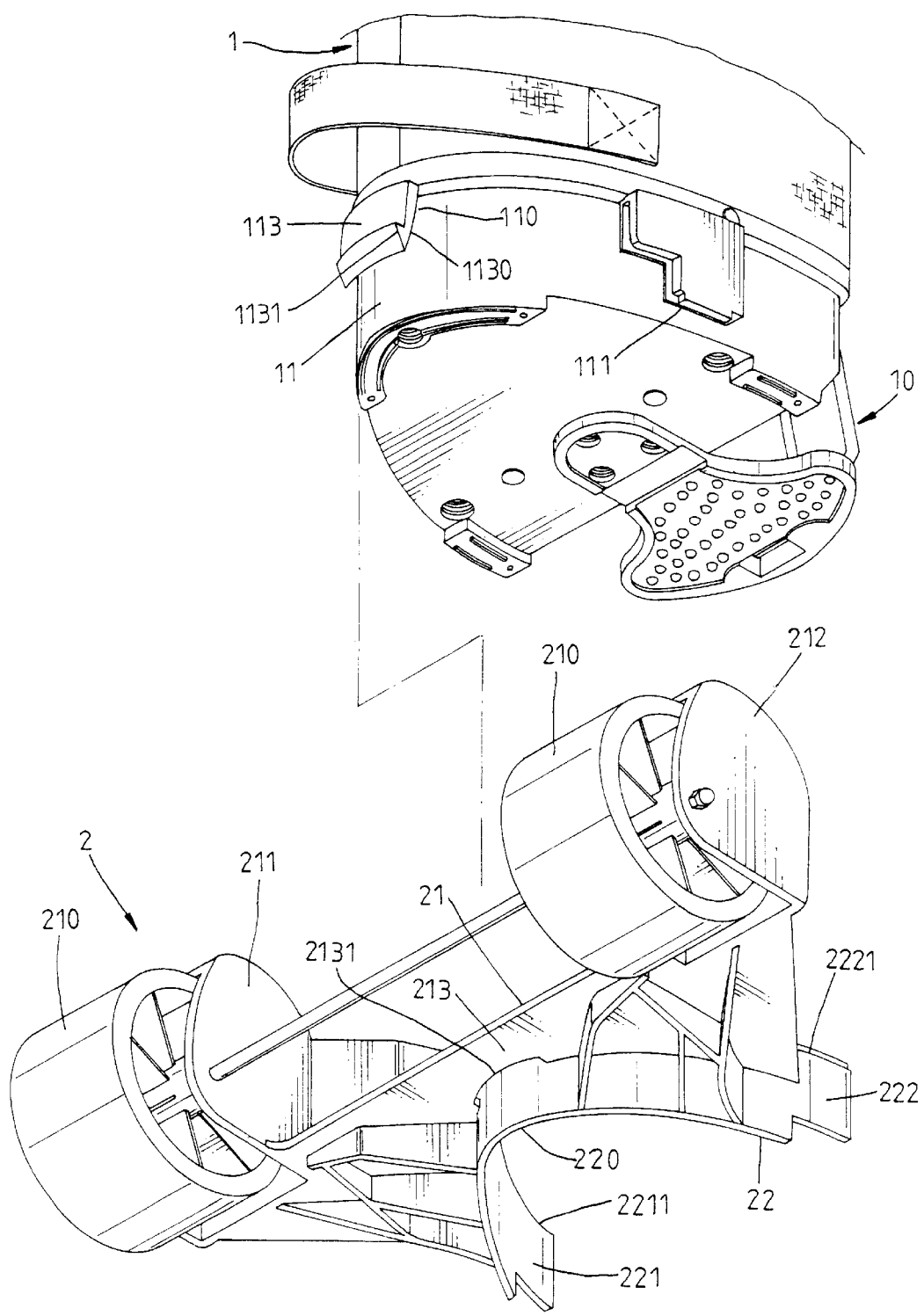
FIG. 2 is an exploded view in partial of a golf bag cart according to the present invention.
Figure 3:
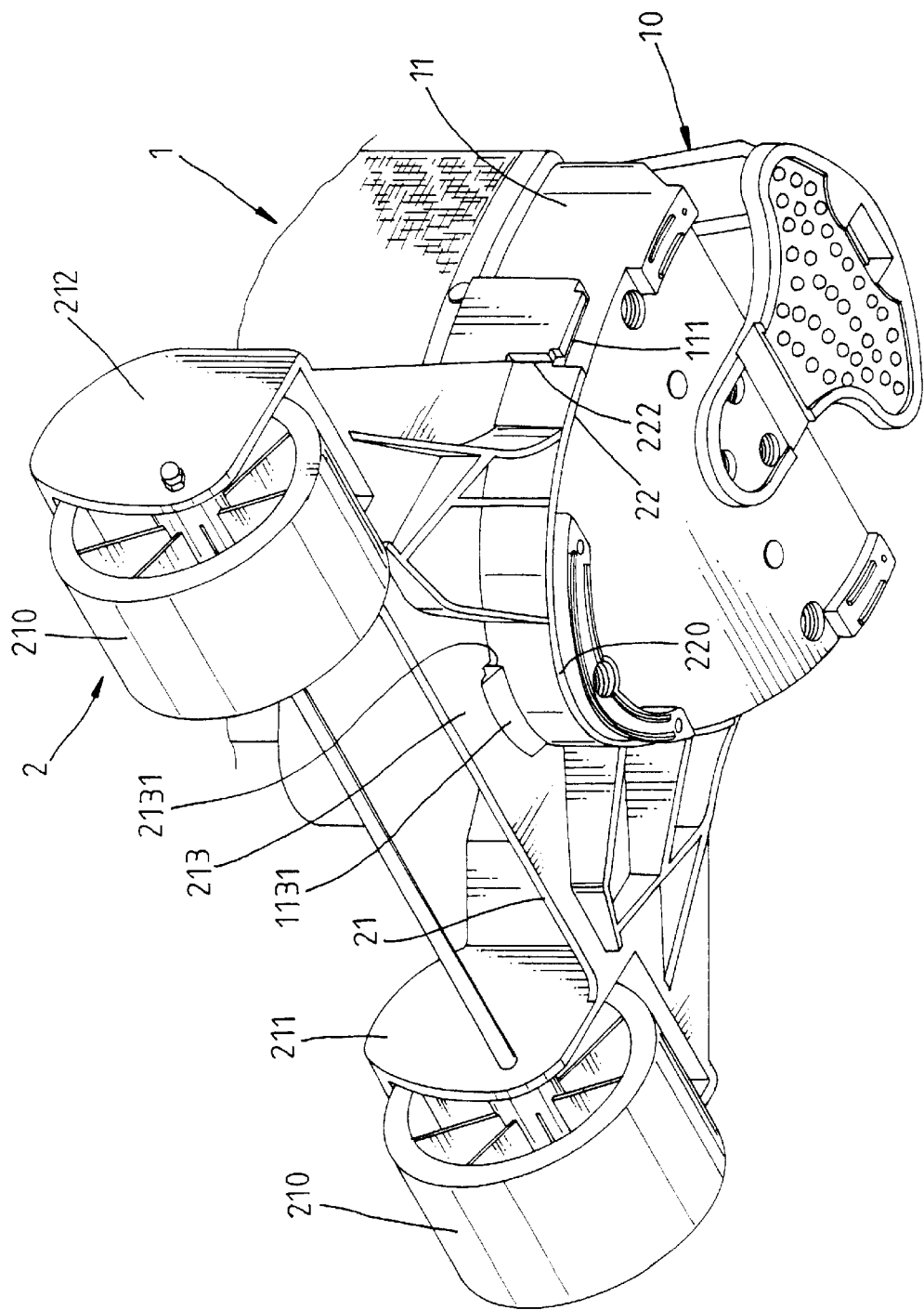
FIG. 3 is an assembly view of FIG. 2.
Figure 4:
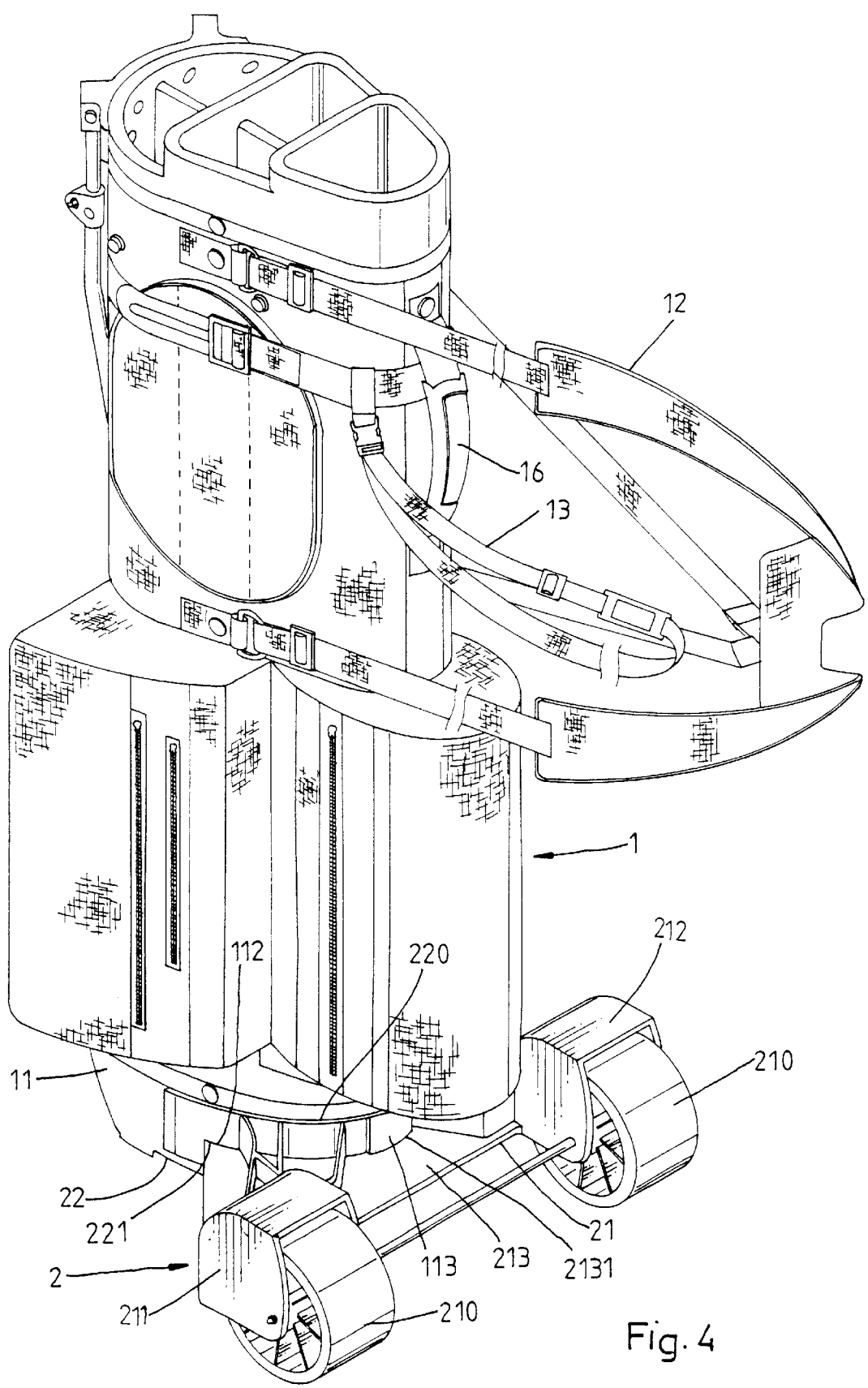
FIG. 4 is a perspective view of the golf bag cart according to the present invention.

Referring to FIGS. 2 and 3 again, the golf bag 10 can easily be disconnected from the cart 2 simply by pressing the hooked portion 1131 of the springy retaining block 113 inwards to disengage the springy retaining block 113 from the retaining hole 2131 of the cart 2 for enabling the plug portions 222 of the cart 2 to be respectively disconnected from the plug holes 111 and 112 of the plastic bottom cuff 11 of the golf bag 1.

Further, the outside wall 220 of the smoothly arched supporting frame 22 of the cart 2 fits the curvature of the peripheral wall 110 of the plastic bottom cuff 11 of the golf bag 1 so that the plastic bottom cuff 11 of the golf bag 1 is closely attached to the smoothly arched supporting frame 22 of the cart 2 after loading of the golf bag 1 on the cart 2.

What is claimed is:

1. A golf bag cart comprising:
    a golf bag, said golf bag comprising a plastic bottom cuff, a front carrying handle, a shoulder strap, a front pulling strap, and a rear foldaway stand; and
    a cart adapted for carrying said golf bag, said cart comprising a base frame, two wheel holders provided at two opposite lateral sides of said base frame, and two wheels respectively pivoted to said wheel holders;

wherein said plastic bottom cuff of said golf bag comprises two plug holes disposed at two opposite lateral sides thereof, and a springy retaining block protruded from the periphery thereof at a front side, said springy retaining block having a fixed end integral with said plastic bottom cuff, a free end terminating in a hooked portion, and a back sidewall spaced from the periphery of said plastic bottom cuff at a distance;

said base frame of said cart comprises a front locating plate, a retaining hole disposed in said front locating plate and adapted for receiving the springy retaining block of said golf bag, and a smoothly arched supporting frame disposed at a front side of said front locating plate and adapted for supporting said golf bag, said smoothly arched supporting frame having two plug portions respectively forwardly extended from two distal ends thereof and adapted for plugging into the plug holes of said plastic bottom cuff of said golf bag.

2. The golf bag cart as claimed in claim 1 wherein the plug portions of said smoothly arched supporting frame of said cart each have a beveled top guide edge adapted for guiding the respective plug portion into the corresponding plug hole in said plastic bottom cuff of said golf bag.

3. The golf bag cart as claimed in claim 1 wherein said smoothly arched supporting frame of said cart has a front sidewall fitting the curvature of the periphery of said plastic bottom cuff of said golf bag.

\* \* \* \* \*